United States Patent

Mangel

[11] 4,034,275
[45] July 5, 1977

[54] OPTICAL CONTROL SYSTEM FOR ELEVATORS

[76] Inventor: Karl Mangel, 4709 B Church St., Skokie, Ill. 60076

[22] Filed: Dec. 29, 1975

[21] Appl. No.: 644,589

[52] U.S. Cl. .............................. 318/461; 318/480; 318/484; 187/29 R
[51] Int. Cl.² ...................................... H02H 7/093
[58] Field of Search ............ 187/29; 318/445, 461, 318/463, 480, 484

[56] References Cited
UNITED STATES PATENTS

| | | |
|---|---|---|
| 2,996,630 | 8/1961 | Bensema et al. ............... 318/480 X |
| 3,389,321 | 6/1968 | Miller et al. .................... 318/461 X |
| 3,617,815 | 11/1971 | Foldvari et al. ............... 318/484 X |
| 3,801,890 | 4/1974 | Ichiyanagi ......................... 318/484 |
| 3,845,375 | 10/1974 | Stiebel ........................... 318/480 X |

Primary Examiner—Robert K. Schaefer
Assistant Examiner—W. E. Duncanson, Jr.
Attorney, Agent, or Firm—Edmond T. Patnaude

[57] ABSTRACT

A reduction in speed of a movable member is sensed by an R. C. time delay circuit including light activated silicon controlled rectifiers which are respectively activated by light beams sequentially applied thereto at the rate of movement of said movable member.

6 Claims, 7 Drawing Figures

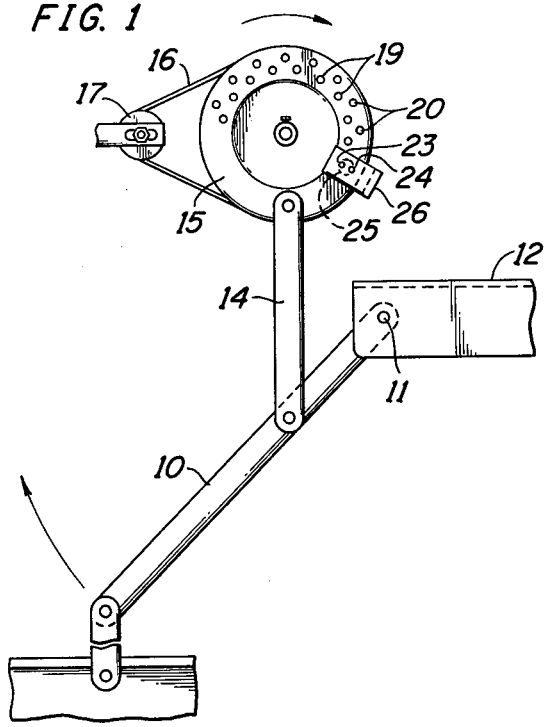
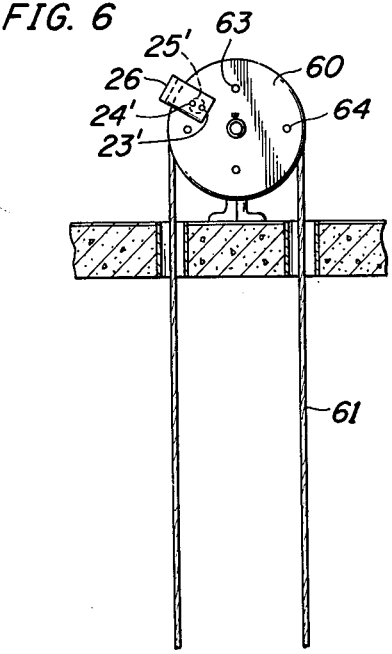
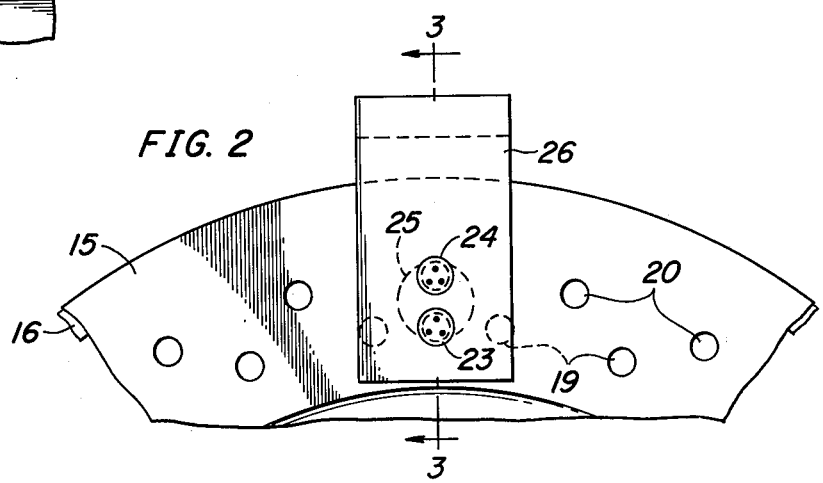
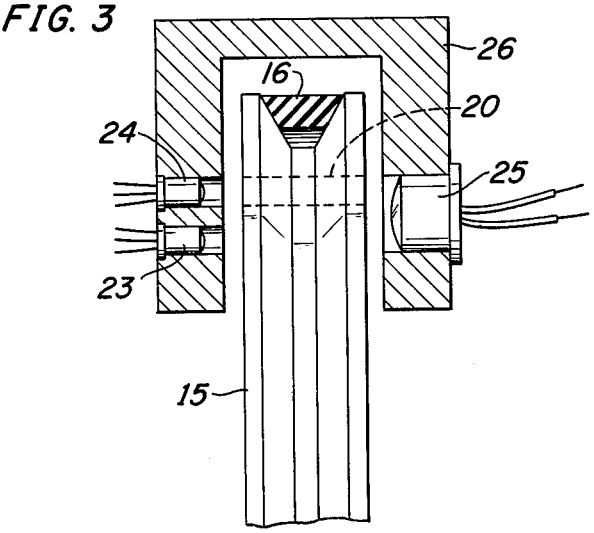

ELEVATOR CONTROL CKT

OPTICAL CONTROL SYSTEM FOR ELEVATORS

The present invention relates in general to optical control systems for controlling the operation of elevators, and it relates more particularly to a new and improved system for detecting the stoppage or deceleration of a movable member such as an elevator car, gate or door.

BACKGROUND OF THE INVENTION

Overspeed governors and elevator door safety edges have commonly used mechanically actuated switches to indicate interference with the normal movement of the car or door. The indication is in the form of an electric signal which deenergizes and brakes the main drive motor in the case of the car or which reverses the door drive in the case of the door. One disadvantage of these prior art controls has been the relatively short life of the switch contacts due to mechanical and electrical wear. A typical problem with the prior art safety edge systems for control of the door movement is that the frequent flexing of the electric cables connected between the doors and the drive system creates maintenance problems by causing frequent breakdowns of the system. It would, therefore, be desirable to provide a control system which when used for door control detects an interference with the movement of the door without employing sensors carried by the door itself, which sensors have necessitated the use of flexible cables, sliding contacts or the like.

SUMMARY OF THE INVENTION

Briefly, in a preferred embodiment of the present invention there is provided a control system which employs a relay which is maintained in a picked up condition by an R. C. time delay circuit including a pair of silicon controlled rectifier which are sequentially activated by pulses of light respectively applied thereto at the rate of movement of a movable member such as the sheave of an overspeed governor or the driven sheave in the elevator door drive.

BRIEF DESCRIPTION OF THE DRAWINGS

Further objects and advantages and a better understanding of the present invention can be had by reference to the following detailed description, wherein:

FIG. 1 is a view of a portion of the door or gate drive of an elevator;

FIG. 2 is a fragmentary, enlarged view of a portion of the driven sheave in FIG. 1, particularly showing the optical motion sensor employed in the control system of the present invention;

FIG. 3 is a sectional view taken along the line 3—3 of FIG. 2;

FIG. 6 is a view of a portion of an overspeed governor for an elevator; and

DETAILED DESCRIPTION OF THE INVENTION

Car Door Control

Figure 4:
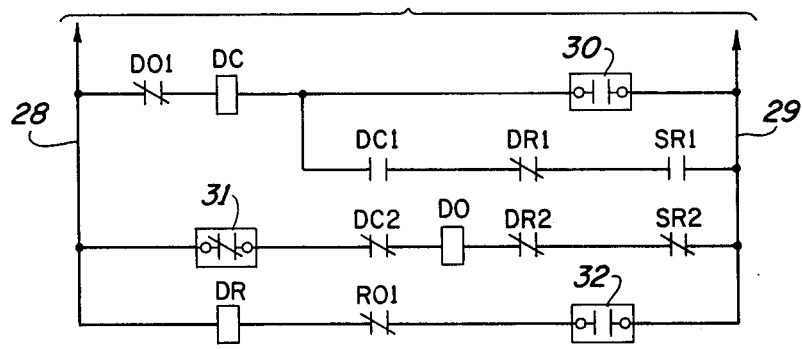
FIG. 4 is a portion of an elevator door control circuit useful in understanding the present invention.

Referring to FIG. 1, an elevator car door or gate, only partially shown, is connected by suitable means to a lever arm 10 pivotally mounted by a pin 11 to a bracket 12 fixed to and forming part of an elevator car. A linkage arm 14 is pivotally connected at one end to the lever arm 10 and is pivotally connected at its other end to a sheave or pulley 15. The sheave 15 is driven by a flexible belt 16 which also passes over a drive sheave 17 mounted on an output shaft of a speed reduction means driven by an electric motor. As thus far described the door drive is conventional and slippage of the belt 16 on the sheave 15 permits the door or gate connected to the lever arm 10 to be stopped by an external object while the drive motor is operating. The velocity of angular rotation of the sheave 15 is proportional to the speed of the gate or door.

In accordance with an important feature of the present invention the sheave 15 is provided with two sets of openings 19 and 20 respectively arranged on circles of different radii. The openings 19 in the inner set are equi-angularly spaced between the openings 20 in the outer set whereby the openings in the two sets alternately and sequentially pass a pair of light activated silicon controlled rectifiers 23 and 24, hereinafter referred to as SCR23 and SCR24, fixedly mounted in a plane which is parallel to and intersects the axis of rotation of the sheave 15. A light source 25 is mounted on the opposite side of the sheave 15 so that light is selectively and sequentially directed onto the SCRs 23 and 24 as the sheave 15 is rotated. As shown in FIG. 3 the SCRs 23 and 24 and the light source 25 are mounted by a V-shaped member 26 having its legs extending on opposite sides of the sheave 15. Should the sheave 15 stop, as for example, when the door is physically held in an open position by a passenger, the SCRs 23 and 24 will not be sequentially activated thereby to provide an indication that the door is not moving. While it is preferable that the openings 19 and 20 be provided in the driven sheave 15, other means for activating the SCRs 23 and 24 at a rate proportioned to the movement of any member movable with the door or gate may be employed.

Referring to FIG. 4, a source of single phase A C voltage is connected across a pair of power busses 28 and 29 for powering the door or gate drive of the elevator. The main power switches and safety relays are not shown. In order to initiate closing of a gate or door, which is in the fully open position, a set of normally open switch or relay contacts 30 are momentarily closed by any suitable means to cause a door close relay DC to pick up through a set of normally closed contacts DO1 on a door open relay DO which is dropped out when the door is fully open. The relay DC remains picked up after the contacts 30 open by means of a holding circuit including a pair of normally open contacts DC1 on the door closed relay DC, a pair of normally closed contacts DR1 on a gate or door relay and a set of normally open contacts SR1 on a safety relay SR. As more fully explained hereinafter in connection with FIG. 5, the safety relay SR is picked up when the door close relay DC is initially picked up. Under normal conditions the door close relay DC remains picked up until the door is fully closed which causes the gate or door relay DR to pick up and open the normally closed contacts DR1.

Should the door or gate be held from closing by an obstacle such, for example, as a passenger, the safety relay SR drops out causing the contacts SR to open and deenergize the door close relay DC. Moreover, the normally closed contacts SR2 close and pick up the door open relay DO through normally closed contacts DR2 on the gate or door relay DR, normally closed contacts DC2 on the door close relay DC, and normally closed contacts 31 on a door open limit switch which is open only when the gate or door is fully open. Accordingly, when the safety relay SR drops out during a door closing operation, the direction of motion of the gate or door is reversed.

When the door is fully closed, a set of normally open gate or door contacts 32 are closed to pick up the gate or door relay DR whereby the contacts DR1 and DR2 open to drop out whichever of the relays DO or DC is picked up.

Figure 5:
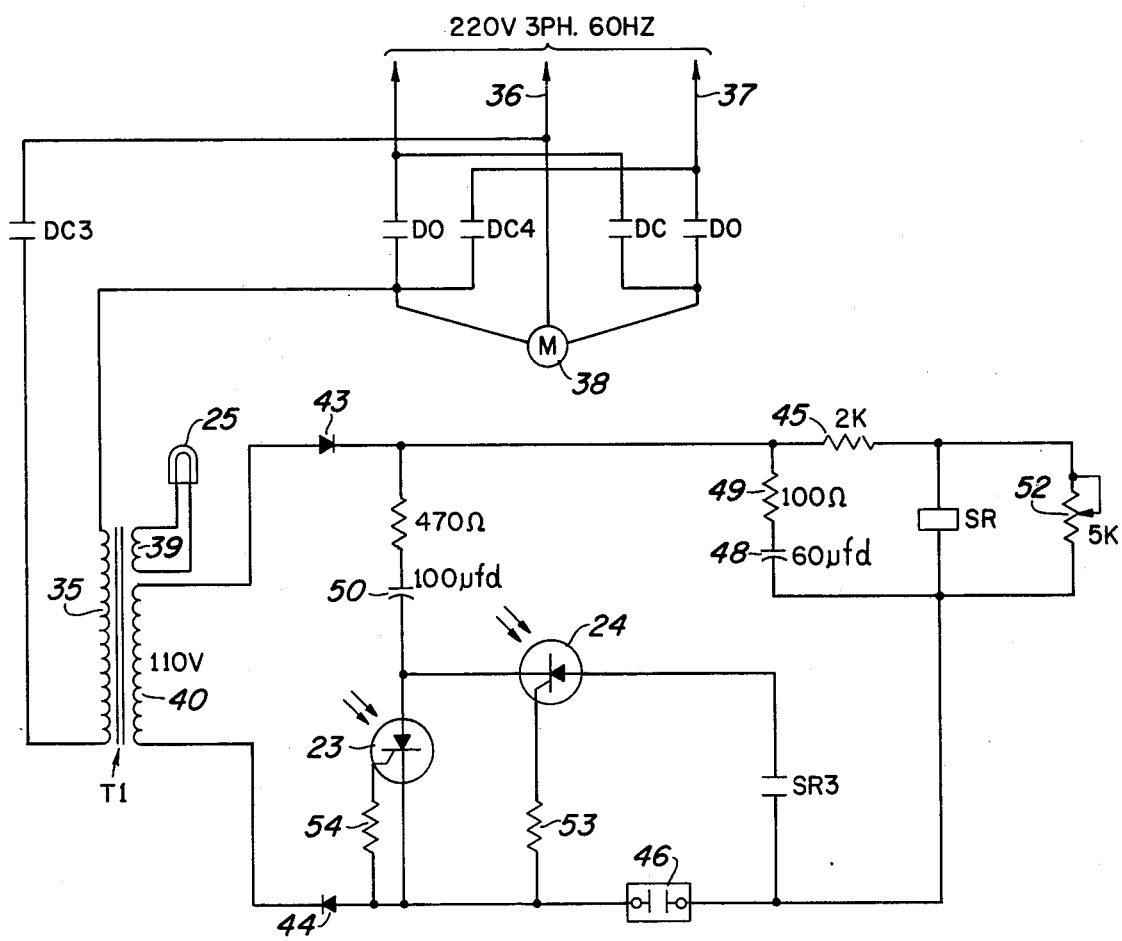
FIG. 5 is a schematic circuit diagram of an optical control system embodying the present invention and used to control the operation of an elevator door or gate.

Referring to FIG. 5, there is shown a control circuit embodying the present invention for causing the safety relay SR to drop out when the door is impeded while the door drive is in the closing mode of operation. As shown, the primary winding 35 of a power transformer T1 is serially connected with two sets of normally open contacts DC3 and DC4 on the door close relay DC across a pair of power busses 36 and 37. Other normally open contacts on the door close relay and on the door open relay are used to energize the gate or door drive motor 38 which drives the sheave 17 shown in FIG. 1 in one direction or the other to open or close the door.

A secondary winding 39 on the transformer T1 powers the light source 25 whenever the door close relay DC is picked up, i.e., during a door closing operation. Another secondary winding 40 powers the safety relay control circuit when the door close relay DC is picked up. A pair of rectifiers 43 and 44 are reversely connected to opposite ends of the winding 40 so that half-wave rectified AC current flows therethrough. The coil of the safety relay SR is serially connected with a current limiting resistor 45 and a set of normally open contacts 46 on the door open limit switch across the output terminals of the rectifiers 43 and 44. Accordingly, when the door is fully open and the contacts 46 are closed and the door close relay picks up, the safety relay SR is picked up. In addition, a capacitor 48 connected in series with a small current limiting resistor 49 across the coil of the safety relay is fully charged.

As the gate or door begins to close and moves away from the fully open position, the limit switch contacts 46 open. However, the safety relay SR remains picked up by virtue of the capacitor 48 discharging through the coil thereof. Assuming a normal closing operation, prior to the charge on the capacitor 48 decaying below the level required to hold the safety relay SR picked up, a capacitor 50, which is serially connected with the anode and cathode of the SCR 23 across the rectifiers 43 and 44 has been charged and maintains the relay SR picked up by discharging through the relay coil when SCR 24 fires.

The capacitor 50 is charged during the positive half cycle of the power source when the SCR 23 is fired by the pulse of light from the source 25. When the SCR 24 is then fired by the next pulse of light thereon, the capacitor 50 recharges the capacitor 48 and also supplies current to the coil of the relay SR. If, therefore, the SCRs 23 and 24, fire in sequence before the charge on the capacitor 48 decays below the holding level for the safety relay SR, the safety relay will remain picked up. If however, the door is impeded so as to be stopped or slowed down such that the time interval between the successive firings of the SCRs 23 and 24 is greater than the time required for the charge on the capacitor 48 to decay below the holding level, the safety relay SR will drop out and cause the door to reopen in the manner described above.

In order to permit adjustment of the door speed at which the safety relay SR drops out, a variable resistor 52 is connected, as shown, across the coil of the relay SR. In order to assure that the SCR 24 does not fire prematurely, the gate thereof is connected through a resistor 53 to the cathode of the SCR 23. The gate of the SCR 23 is connected through a resistor 54 to the cathode thereof.

Car Drive Control

Figure 7:
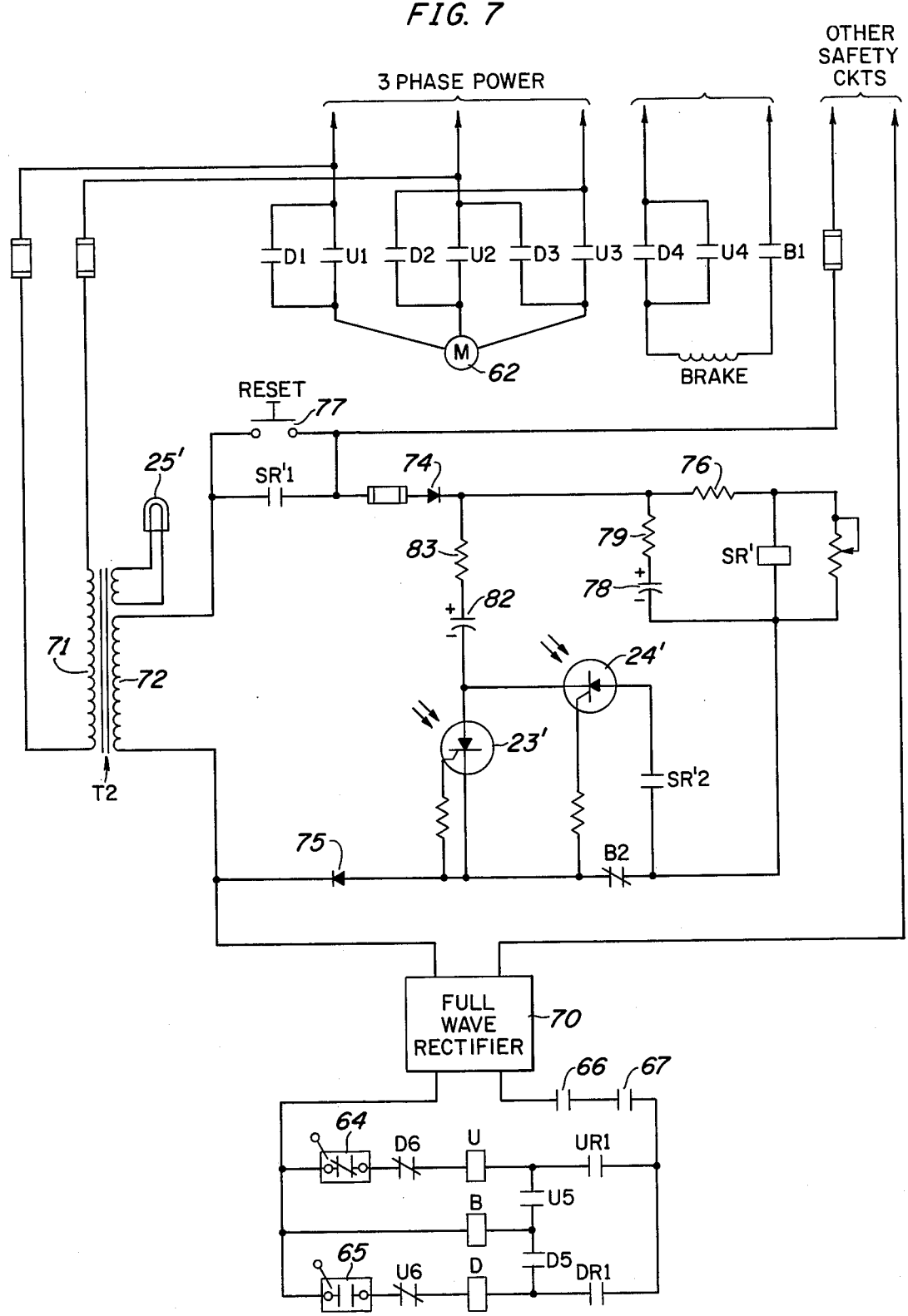
FIG. 7 is an optical control system embodying the present invention and used to interupt the operation of an elevator drive system when movement of the car is impeded.

Referring now to FIG. 6, a sheave or pulley 60 is connected by a cable 61 to an elevator car, not shown, which is driven up and down in the elevator shaft by a motor 62 shown in FIG. 7. The pulley 60 is connected to a governor which activates a safety device to stop the elevator car should its downward speed exceed a predetermined value.

In some elevator systems, if the elevator car is impeded for one reason or another, the drive motor will continue to rotate the drive pulley and erode the main cable of the elevator. The present invention makes use of the overspeed governor mechanism for deenergizing the main drive motor if the elevator car is stopped with the motor 62 running in either the up or down direction.

To this end, the same optical control system described above in connection with FIGS. 1-5 is employed. The sheave 60 is provided with two sets of openings 63 and 64 arranged respectively on circles of different radii for alternately and sequentially admitting light from the source 35 onto the light activated silicon controlled rectifiers. SCRs 23' and 24' as shown in FIG. 7. Since the cable 61 is directly connected to the elevator car the speed of rotation of the sheave 60 and thus the rate at which the SCRs 23' and 24' are activated is directly proportioned to the speed of the car.

Referring now to FIG. 7, the main drive motor 62 for the elevator is adapted to be connected across a source of three phase power by normally open contacts D1,U1; D2,U2; and D3,U3 for raising or lowering the elevator car in the conventional manner. When the down contactor D picks up and the normally open contacts D1, D2 and D3 thus close, the motor rotates in a direction to lower the car, and when the up contactor U picks up, the normally open contacts U1, U2 and U3 are closed to cause the motor to rotate in the opposite direction to raise the car.

The coil of the up contactor U is serially connected with a set of normally closed contacts D6 on the down contactor D, a set of contacts 64 on a limit switch which is open only when the car is in the top-most position, and a set of normally open control contacts UR1 on an up direction relay UR operated by the normal control circuits of the elevator to close the contacts UR1 to initiate moving the car in the up direction. The coil of the down contactor D is similarly connected with normally open contacts U6 of an up contactor U and normally open contacts 65 of a limit switch which is open only when the car is in the bottom-most position. A brake contactor B is energized whenever the up or down contactors are picked up. When the brake contactor B is deenergized the car brake is activated to stop or prevent movement of the car. Normally open car door and landing door switches 66 and 67 are provided to prevent operation of the car until both doors are closed.

The up, down and brake contactors are powered from the output of a conventional full wave rectifier 70 which is energized through a set of normally open contacts SR'1 on the safety relay SR'. The safety relay SR' drops out when the pulley 60 stops thereby causing one or the other of the contactors U and D to drop out and thereby deenergize the drive motor 62.

Considered in greater detail, the primary winding 71 of a transformer 72 is connected across a source of three phase voltage so as to be energized whenever the associated elevator system is in operation. A secondary winding 72 powers the rectifier 70 through a set of normally open contacts SR'1 on the safety relay SR' and also supplies half-wave rectified A C current to the safety relay control circuits through diode rectifiers 74 and 75. The coil of the safety relay SR' is serially connected between the diodes 74 and 75 with a resistor 76 and a set of normally closed contacts B2 on the brake contactor B. When a start or reset switch 77 is closed, the safety relay SR' picks up and a capacitor 78 connected in series with a resistor 79 and the resistor 76 across the coil of the relay SR' is charged. The safety relay SR' remains picked up through its holding contacts SR'1 and the brake contacts B2 after the normally open spring loaded reset switch 77 is released.

Once the brake contactor B is energized to permit the elevator car to move, the safety relay SR' is no longer directly energized from the main source of power inasmuch as the brake contacts B2 open. Rather, the relay SR' is held in the picked up position by current from the capacitor 78. The capacitor 78 is charged whenever the SCR 23' has fired to charge a capacitor 82 through a resistor 83 and the SCR 24' has subsequently fired to discharge the capacitor 82 through the resistor 83 and safety relay contacts SR'2. Should the elevator car be stopped while the brake contactor B is picked up, SCR 23' and SCR 24' will not be sequentially activated since the sheave 60 will stop rotating wherefor the safety relay SR'1 will open to deenergize the rectifier 70 causing the brake contactor B and either the up or down contactor U or D also to drop out. After the obstruction has been cleared, the reset switch 77 can be momentarily closed thereby to set the system into operation.

Although the circuit parameters in the control circuits shown in FIGS. 5 and 7 are not critical, those values which provide a satisfactory safety door control system are shown in FIG. 5 in the drawings. It will be understood, however, that preferred circuit values will vary with such things as speed of the door or car and the rate of light pulses on the SCRs.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:
1. In an elevator control system, a circuit for sensing a reduction in the speed of a movable member, comprising
   a relay having a solenoid,
   a half-wave rectifier adapted to be connected to a source of A C voltage,
   a first light activated silicon controlled rectifier,
   a first capacitor,
   said silicon controlled rectifier and said capacitor being connected in series across the output of said half-wave rectifier,
   a second light activated silicon controlled rectifier connected in series with said capacitor across said solenoid,
   a second capacitor connected across said solenoid, and means responsive to the speed of movement of said movable member for selectively and alternately applying light to said silicon controlled rectifiers at a rate proportional to the speed of said movable member,
   whereby said relay is dropped out if said silicon controlled rectifiers are not sequentially activated at more than a predetermined rate.
2. The combination according to claim 1 wherein said means for alternatively and selectively applying light to said rectifiers comprises
   a source of light,
   a member having two sets of openings respectively aligned with said source of light and said silicon controlled rectifiers,
   whereby movement of said member causes the openings in said sets to alternately convey light from said source to said silicon controlled rectifiers.
3. The combination according to claim 2 wherein said member is a pulley, and
   said sets of holes are arranged in said pulley on circles of different radii.
4. The combination according to claim 3 comprising drive means for opening and closing an elevator door, and
   said drive means includes said pulley, and the rotation of said pulley is proportional to the movement of said door.
5. The combination according to claim 3 comprising means connecting said pulley to an elevator car so that said pulley has a spread of rotation proportional to the speed of said elevator car.
6. In an elevator control system, a circuit for sensing a reduction in speed of a movable member, comprising,
   means for producing first and second sets of light pulses at a rate proportional to the speed of movement of said member,
   the light pulses in said sets being alternately interspersed in time,
   a first capacitor,
   means for charging said first capacitor during the occurrence of light pulses in said first set,
   a control means,
   a seconnd capacitor connected to said control means for operating said control means as said second capacitor discharges therethrough, and
   means for charging said second capacitor from said first capacitor during the occurrence of said light pulses in said second set,
   whereby said control means is operated as long as said pulses occur at no less than a predetermined rate.

* * * * *